United States Patent [19]

Young et al.

[11] Patent Number: 4,914,956

[45] Date of Patent: Apr. 10, 1990

[54] METHOD AND CIRCUIT FOR PROCESSING SENSORY INPUT SIGNALS OF THE TYPE OBTAINED FROM CORIOLIS MASS FLOW RATE SENSORS AND THE LIKE

[75] Inventors: Alan M. Young, Los Gatos; E. Ronald Blake, San Jose, both of Calif.

[73] Assignee: Exac Corporation, Campbell, Calif.

[21] Appl. No.: 76,512

[22] Filed: Jul. 22, 1987

[51] Int. Cl.$^4$ ............................................... G01F 1/84
[52] U.S. Cl. .................................. 73/861.38; 364/510
[58] Field of Search ...................... 73/861.37, 861.38; 364/510

[56] References Cited

U.S. PATENT DOCUMENTS

| | | | |
|---|---|---|---|
| 4,187,721 | 2/1980 | Smith | 73/861.38 |
| 4,823,614 | 4/1989 | Dahlin | 73/861.38 |

*Primary Examiner*—Herbert Goldstein
*Attorney, Agent, or Firm*—Rosenblum, Parish & Bacigalupi

[57] ABSTRACT

An improved method and circuit for processing sensory input signals of the type obtained from Coriolis mass flow rate sensors and the like including differencing circuitry responsive to inputs received from two motion pick-up devices and operative to generate a "different" signal which is directly proportional to the difference therebetween, integrator circuitry for reducing the frequency dependency by one order and shifting the phase of the difference signal by 90 degrees, summing circuitry responsive to the signals generated by the two pick-ups and operative to develop a "sum" signal which is proportional to the sum thereof, and dividing circuitry for dividing the integrated difference signal by the sum signal to develop an output signal which is directly proportional to the rate of mass flowing through a conduit to which the two pick-up devices are attached.

16 Claims, 5 Drawing Sheets

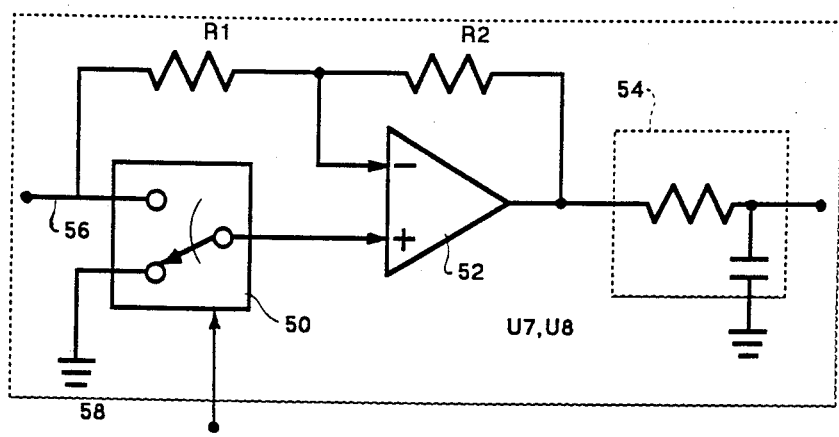
FIG. 4
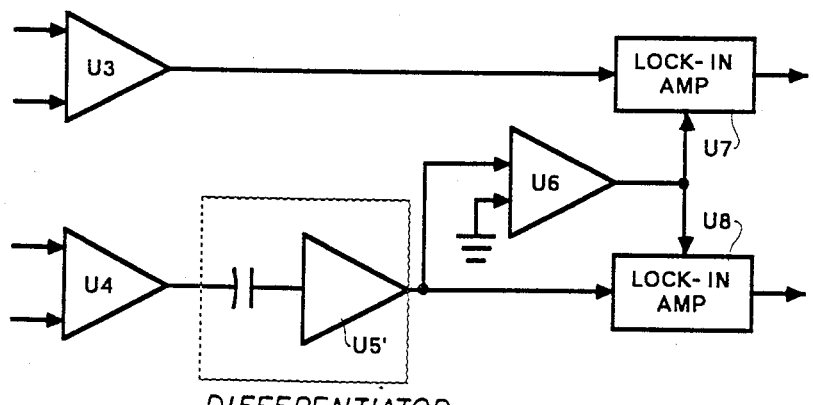
DIFFERENTIATOR FIG. 5

METHOD AND CIRCUIT FOR PROCESSING SENSORY INPUT SIGNALS OF THE TYPE OBTAINED FROM CORIOLIS MASS FLOW RATE SENSORS AND THE LIKE

The present invention relates generally to Coriolis type mass flow meters and more particularly to an improved method and circuit for processing two electrical signals obtained from motion detectors coupled to one or more tubular conduits carrying a flowing mass and driven or excited so as to experience Coriolis acceleration.

DESCRIPTION OF THE PRIOR ART

Numerous techniques are known in the prior art for processing the information that can be obtained by measuring the Coriolis forces or the effects therefrom induced in a straight, bent or looped conduit. For example, in the Sipin U.S. Pat. Nos. 3,329,019, 3,355,944 and 3,485,098 the velocity of conduit displacement on opposite sides of a "drive" point is measured and the difference there between is read using an AC voltmeter calibrated to provide an indication of mass flow rate. However, as will be pointed out below, the use of the difference between two velocity signals as a means of indicating mass flow rate involves a factor of w corresponding to the drive frequency. If the drive frequency is not constant, errors in determining mass flow rate result. Also, under resonant operation, the drive frequency, w varies with fluid density, and such variations result in substantial mass flow rate measurement error. Sipin did not recognize this source of error.

Sipin also controlled his driving means with a signal that was proportional to the sum of the two "velocity" signals measured. However, it has been found in the use of similar circuits that, as circuit components age, or if such components are replaced, or the conduit driving means (e.g. magnet and/or coil) are replaced, the sum of the velocity signals will not provide for constant drive level. Thus, errors in the mass flow rate measurement will result in direct proportion to changes in drive amplitude, and flow meter recalibration will be necessary.

Dahlin et al, U.S. Pat. No. 4,660,421 and Kappelt, U.S. Pat. No. 4,655,089, teach the detection of non-linear variation of phase shift with mass flow rate, a technique which although effective, is undesirable from a signal processing view point. Kappelt also explains how the time difference method disclosed in the Smith Pat. Nos. RE31,450, U.S. Pat. Nos. 4,422,338 and 4,491,025, fails to properly take into account problems associated with drive frequency variations. Each of the systems disclosed in the above mentioned patents can be adversely affected by excessive vibrational noise or hydraulic noise creating spurious signals in the motion detectors, and such noise will excite unwanted resonant vibratory modes in the tubular conduits which contribute adversely to signal measurement.

In an attempt to provide an accurate measurement at or near the oscillation midplane, the Smith U.S. Pat. No. 4,422,338 requires the use of analog sensors which are linearly representative of the actual motion over the full range of motion, a limitation that adds both cost and complexity to the design.

Roth U.S. Pat. Nos. 3,132,512 and 3,276,257 disclose methods of processing analog signals obtained from "velocity" pick-up devices, but require additional signal inputs obtained from a driving motor, or other velocity pick-ups, to provide reference signals for his signal processing. Besides requiring a pair of sensing coils and a pair of reference coils, Roth connects his sensory coils in series opposing fashion, a technique that requires precise matching of sensing pick-ups to obtain no flow rate signal at zero flow.

SUMMARY OF THE PRESENT INVENTION

It is therefore an object of the present invention to provide a novel method and circuit for measuring mass flow rate using information contained from two sensors affixed to a vibrated conduit and which has no frequency dependency and no adverse dependency on fluid density.

Another object of the present invention is to provide a method and circuit of the type described which will not have its calibration adversely affected by changes in drive level caused by aging, drifting component parameters.

Still another object of the present invention is to provide a method and circuit of the type described in which a continuous output signal is provided that varies linearly with mass flow rate.

Yet another object of the present invention is to provide a method and circuit of the type described which is not adversely affected by external mechanical or internal hydraulic noise or resonant modes of operation at frequencies in proximity to the operating frequency of the device.

A still further object of the present invention is to provide a method and circuit of the type described which does not require motion pickup devices that respond linearly throughout their entire range of measurement.

Still another object of the present invention is to provide a method and circuit of the type described which does not require the generation of additional signals to provide reference inputs.

Briefly, a preferred embodiment of the present invention includes differencing circuitry responsive to inputs received from two motion pick-up devices and operative to generate a "difference" signal which is directly proportional to the difference therebetween, integrator circuitry for reducing the frequency dependency by one order and shifting the phase of the difference signal by 90 degrees, summing circuitry responsive to the signals generated by the two pick-ups and operative to develop a "sum" signal which is proportional to the sum thereof, and dividing circuitry for dividing the integrated difference signal by the sum signal to develop an output signal which is directly proportional to the rate of mass flowing through a conduit to which the two pick-up devices are attached.

In accordance with the present invention, "velocity measurements" are utilized to provide highly accurate mass flow rate measurements. This is in contrast to the teaching of Smith '450 wherein it is indicated that "velocity measurements" provide "at best only minimal results". More specifically, in distinguishing Sipin '098 the Smith '450 patent teaches that the disclosed method and apparatus "is specifically structured to minimize or obviate the forces generated by the two non-measured opposing forces, i.e., velocity drag and acceleration of mass. This effort has been successful to the point where such forces are present in cumulative quantities of less than 0.2% of the torsional spring force." In contrast to Smith, the present invention provides a way of measuring mass flow rate even in the presence of substantial competing forces. For example, the driving oscillation of the conduit introduces inertial accelerations that vary from zero (when the conduit(s) is at its rest position) to values that exceed the magnitude of the mass flow induced Coriolis forces by many orders of magnitude when the conduit is at its extremes of motion. Additionally, helical conduits such as those disclosed in the Dahlin et al '421 patent are subjected to additional forces resulting from fluid hydrostatic pressure and centrifugal forces that can cause the helical conduit to experience forces causing it to "twist" or distort. Such forces would adversely impair the accuracy of mass flow measurement if such a conduit, or other conduit of a three-dimensional nature, were employed within the context and scope of the teaching of the '450 patent.

In further contrast to the Smith '450 patent, the present invention provides a new way of measuring mass flow rate throughout the oscillation cycle of a vibrating conduit without the limitation of having to minimize the Smith's "non-measured opposing forces".

An important advantage of the present invention is that a signal processing circuit is provided wherein the response characteristics of the two pick-up devices need not be precisely matched in harmonic content.

Another advantage of the present invention is that it provides a circuit having the ability to reject extraneous electrical noise introduced into the motion pick-ups from electrical, mechanical and/or hydraulic noise sources.

These and other objects and advantages of the present invention will no doubt become apparent to those skilled in the art after having read the following detail description of the preferred embodiments which are illustrated in the several figures of the drawing.

IN THE DRAWING

FIG. 4 is a diagram schematically illustrating the functional components of a lock-in amplifier(L.I.A.) of the type used in the embodiment of FIG. 3;

FIG. 5 is a diagram illustrating a portion of the circuit of FIG. 3 wherein a differentiator of the sum signal is substituted for the integrator of the difference signal. The L.I.A. outputs will be the same as FIG. 3;

DETAILED DESCRIPTION OF THE PREFERRED EMBODIMENTS

Figure 1:
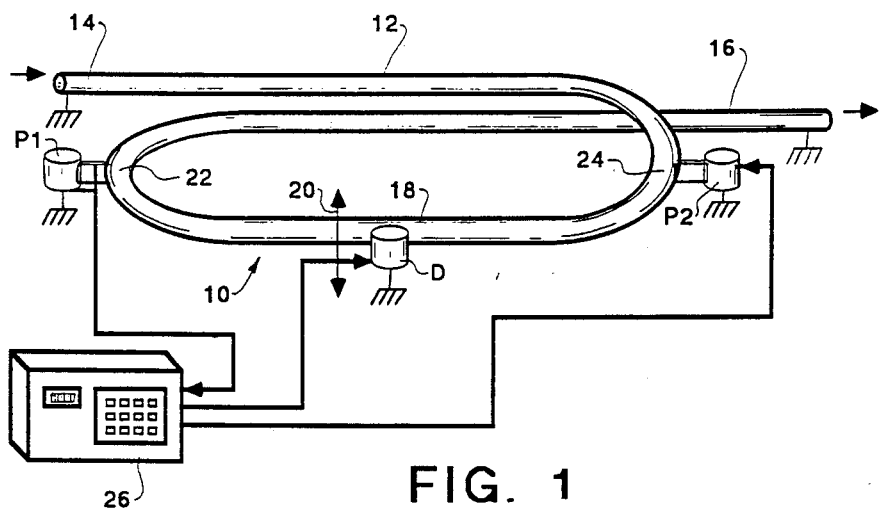
FIG. 1 is a diagram schematically illustrating the principal operative components of a Coriolis mass flow meter.

Referring now to FIG. 1 of the drawing, there is shown, in simplified form, a Coriolis mass flow rate measurement device including a sensor tube 10 which can be of any configuration, but for purposes of illustration is shown as a cross-over loop of the type disclosed in U.S. Pat. No. 4,660,421. It is to be understood however, that any tube configuration can be utilized. As illustrated, the sensor 10 includes an elongated, generally helically wound cross-over loop 12, each end of which is suitably affixed to a mounting, as indicated at 14 and 16 respectively. Coupled to the drive portion 18 of the loop 12 is a magnetic drive source D for exciting the loop and causing it to vibrate up and down as depicted by the arrow 20.

Coupled to the leftmost loop extremity 22 and rightmost loop extremity 24 are magnetic pickup devices P1 and P2 respectively, which, in the preferred embodiment, are "velocity-type" pick-ups. It will be appreciated however, that any other suitable type of pickup could be utilized, such as those of the "position" or "acceleration" type, for example. Additionally, it will be appreciated that pick-up devices P1 and P2 need not be located at opposing or "symmetrically opposite" positions on the conduit.

Drive energy for unit D, typically in the form of an alternating voltage is provided by an electronic drive control and monitoring system 26 which also receives signals generated by the pick-ups P1 and P2, and in response thereto develops mass flow rate information for recording or display. As is well known in the prior art, in response to the oscillatory forces applied to of the loop 12 by drive unit D, corresponding motion will be transmitted to the loop extremities 22 and 24, and such motion will be detected by the pick-up units P1 and P2. As is also well known, with mass flowing through the loop 12, signals generated by the respective pick-up units will differ by an amount which is related to the mass flow rate of material passing through the loop 12.

As indicated above, it has historically been the practice to measure either time difference of passage of the tube motion sensing points through a mid-plane of oscillation, as disclosed in the Smith '450, '338 or '025 patents; or to measure the phase shift between the two sensed signals, as disclosed in Dahlin et al '421 patent; or to measure the voltage difference between the outputs of the two sensors as a measure of mass flow rate when the input to drive D is held constant, as taught in the Sipin '019, '944 and '098 patents. However, as pointed out above, such measurement techniques are all subject to certain disadvantages.

Figure 2:
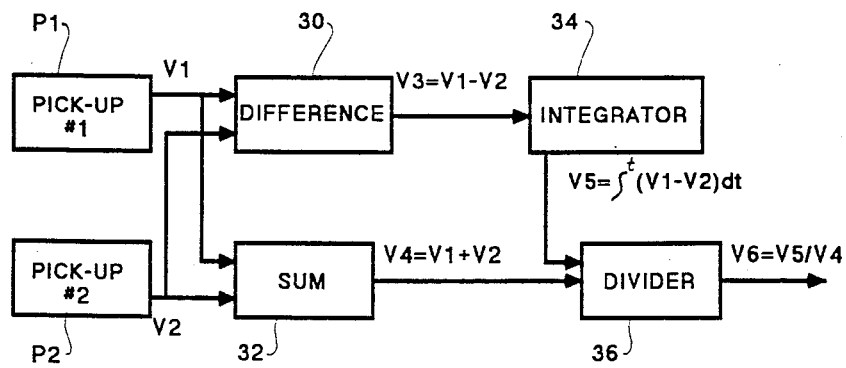
FIG. 2 is a block diagram generally illustrating the circuit and processing method of the present invention.

In FIG. 2 of the drawing, a novel signal processing circuit and method in accordance with the present invention is illustrated generally in block diagram form, and includes a differencing component 30, a summing component 32, an integrating component 34, and a dividing component 36. As suggested by the drawing, the differencing component 30 responds to the voltage signals V1 and V2 generated by pick-up units P1 and P2, and develops a difference signal $$V3 = V1 - V2. \tag{1}$$

The difference signal V3 is then integrated over a period of time by the integrating component 34 to develop a voltage $$V5 = \int^t (V1 - V2) dt \tag{2}$$

At the same time, summing component 32 responds to the voltages V1 and V2 and develops a sum voltage $$V4 = V1 + V2 \tag{3}$$

The voltages V4 and V5 are then input to the dividing component 36 that in turn develops an output voltage $$V6 = V5/V4 \quad (4)$$

which is directly proportional to mass flow rate. However, as contrasted with prior art techniques, such signal is not subject to error caused by disturbances of the type discussed above.

As an illustration of the present invention, consider the following: under no-flow conditions and with a drive excitation voltage proportional to Ae sinwt where w = the driving or excitation frequency applied to the drive "point" D, and Ae = the "excitation" or drive amplitude at the location of the pickups P1 and P2.

The voltage signals generated by pick-ups of the velocity types, P1 and P2, will be equal to each other as represented by $$V1 = V2 = Ae \, w \, \cos wt \quad (5)$$

However, when mass is flowing through the tube 10, it can be shown that $$V1 = w[(Ae \, \cos wt) - (Ar \, \sin wt)] \quad (6)$$

and $$V2 = w[(Ae \, \cos wt) + Ar \, \sin wt)] \quad (7)$$

where

Ar = the "response" amplitude (i.e., the "Coriolis" amplitude) at the location of pickups P1 and P2.

Assuming the tubular conduit structure obeys Hooke's Law in response to Coriolis forces, it can also be shown that $$Ar = k \, Ae \, w \, Qm$$

and therefore, $$Qm = Ar/k \, Ae \, w \quad (8)$$

where k is a proportionality factor (that can be temperature dependent), and Qm is the mass flow rate to be determined.

Now, from equations (6) and (7), V3 and V4 can be defined as $$V3 = V1 - V2 = -2 \, w \, Ar \, \sin wt \quad (9)$$

and $$V4 = V1 + V2 = 2 \, w \, Ae \, \cos wt, \quad (10)$$

and letting $$V5 = \int^t (V1 - V2) dt = 2Ar \, \cos wt \quad (11)$$

and $$V6 = V5/V4 = Ar/w \, Ae, \quad (12)$$

it can be seen that V6 is directly related to Qm, That is, $$Qm = (1/k) \, V6. \quad (13)$$

It will thus be appreciated that the system represented by the block diagram of FIG. 2 is purely analog in nature and involves no timing measurements.

The heart of the present invention begins with the use of the difference signal V3 = V1 − V2.

Figure 10:
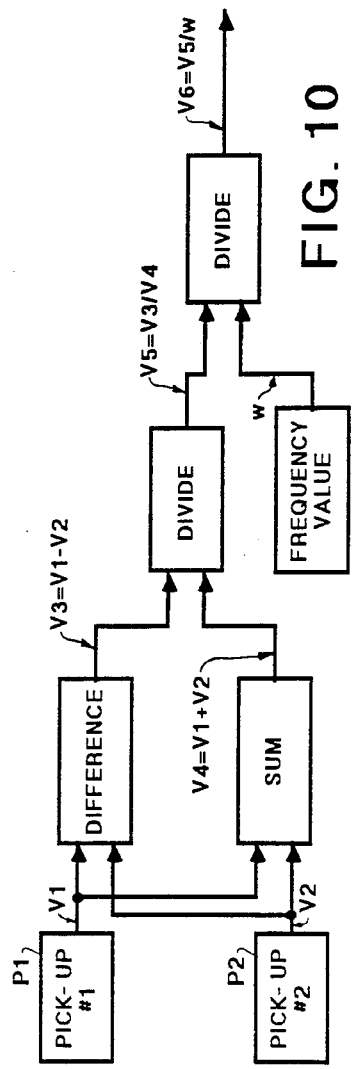
FIG. 10 is a block diagram illustrating an alternative embodiment of the present invention.

Although the nature, character and information content of the signal V3 is completely analogous to the output of Sipin's difference amplifier designated 92 in FIG. 10 of Sipin's '944 and '098 patents, the additional processing performed by the present invention on this difference signal, i.e., the integration and division of the integrated result by the sum of V1 and V2 constitutes a substantial improvement over the Sipin method by eliminating the otherwise adverse effects that fluid density variations and drive amplitude and frequency variations have on the accuracy with which the mass flow rate Qm can be determined.

Figure 3:
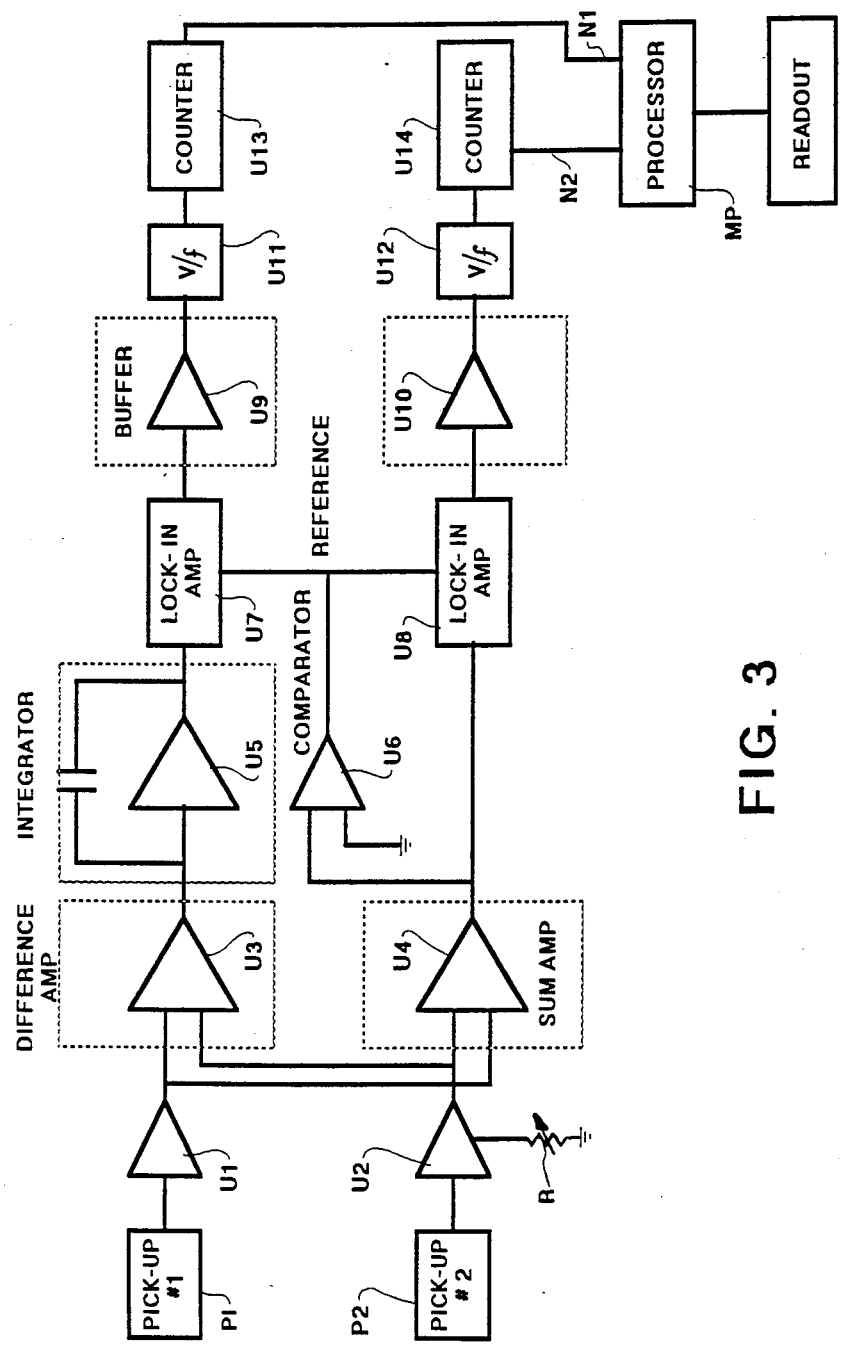
FIG. 3 is a block diagram schematically illustrating a preferred embodiment of a signal processing method and apparatus in accordance with the present invention.

In FIG. 3, a block diagram more specifically illustrating an actual implementation of the present invention is likewise depicted in simplified form. In this embodiment the outputs of the two velocity pick-ups labeled P1 and P2 are amplified by gain stages designated U1 and U2. As suggested by the variable resistor R, the gain factor of each input channel is adjusted to compensate for unequal detected velocity signals, so that the amplifier outputs have approximately equal amplitudes. These two signals are then presented both to a difference amplifier U3 and to a sum amplifier U4. Although there may be some gain associated with the difference amplifier U3 and the sum amplifier U4, the difference signal output by U3 is proportional to the difference between the two input voltages, and the sum signal output by U4 is proportional to the sum of the two input voltages.

The difference signal is then further processed by integration using an integrating amplifier designated U5, and the integrated difference signal is presented to a first lock-in amplifier U7. In the sum channel, the sum signal output by U4 is presented to a second lock-in amplifier U8. The two lock-in amplifiers (U7 and U8) share a common reference signal derived by taking the output of the summing amplifier U4 and inputting it into a 0-Volt biased comparator U6 to obtain a square wave, the frequency of which is the same of that of the sum signal. The square wave is then used as a reference input for both lock-in amplifiers. It should perhaps be pointed out that although the preferred embodiment includes two lock-in amplifiers U7 and U8, the amplifier U8 could be replaced by a precision rectifier or peak detector or the like.

One way of viewing the operation of a lock-in amplifier is that it is like a very narrow band, frequency selective rectifier. Any frequencies present in the signal other than the frequency of the reference, such as additional signals due to external mechanical noise or hydraulic pulsations in the meter that would normally cause extraneous signals to be present in the motion sensing pick-ups P1 and P2, will be rejected by the lock-in amplifiers. The signals output by the lock-in amplifiers are DC voltages that are further amplified by the buffer stages U9 and U10 and then converted to proportional frequencies by voltage-to-frequency converters designated U11 in the difference channel and U12 in the sum channel.

Counters U13 and U14 are used to accumulate counts of each cycle output from the voltage-to-frequency converters U11 and U12, and the counter outputs are interfaced to a micro-processor MP which effectively divides the contents in counter U13 by the contents in counter U14. This is to say that the number N1 stored in counter U13 is divided by the number N2 stored in counter U14, and this ratio is related linearly to mass flow rate. The output of processor MP is then input to a suitable readout device R which provides an output signal that is presented as either a current, a voltage, a frequency, or a readout on a visible display.

In FIG. 4 a schematic illustration is provided of the principal operative components of a lock-in amplifier as an aid to understanding certain benefits achieved through the use of such amplifier in the present invention. Basically, a lock-in amplifier is a phase sensitive detector which can be considered in to include a gain stage 50 including matched resistors R1 and R2 (for gain = −1.00), a gain reversing switch 52 and an RC filter 54. The position of the switch is determined by the polarity of a reference input. If the signal input at 56 is a noise free sinusoid and is in phase with the reference signal applied at 58, the output of the amplifier 52 will be a full-wave-rectified sinusoidal waveform. The signal is filtered by the low-pass filter 54. The output will be proportional to the value of the output of amplifier 52. However, if the input signal and the reference signal are shifted in phase by 90 degrees, the filtered output of amplifier 52 will be zero. Thus, the output of the integrator will be proportional to the RMS value of the fundamental component of the input signal, and to the cosine of the phase angle between the input signal and the reference. The total transfer function of the lock-in amplifier is therefore $$Eout = Ein \cos\Phi \qquad (14)$$

where $\Phi$ is the phase angle between the reference signal and the input signal.

Since the gain reversing amplifier and the output filter transfers the signal information from its input frequency to a DC voltage, the time constant of the filter can be made as long as necessary to provide the narrow band-width required to reject noise accompanying the signal. The noise will not add to the output signal since it will tend to cause symmetrical deviations about the true value of the signal in the output.

Voltage-to-frequency converters U11 and U12 are typically voltage controlled oscillators, the output frequency of which varies in proportion to the input voltage. Other types of "converters" such as integrating (dual-slope) analog-to-digital (A-to-D) converters or ratiometric A-to-D converters could also be employed for this function.

In a Coriolis mass flow measuring device there can be hydraulic noise present in the form of pulsations of the fluid passing through the flowmeter, and there can be unwanted electrical signals picked up by the wiring. The ability of the lock-in amplifier to reject electrical noise of a mechanical nature that might be present in the pipe in which the flow meter is installed, and to selectively pass through only those signals at the same frequency as the reference, and attenuate (by $\cos\Phi$) those that are not inphase with the reference, even if they are of the same frequency, allows the present invention to deal with much higher levels of vibration and noise than that of a purely digital phase measurement system.

Additionally, besides the ability to reject noise introduced into the motion pickups P1 and P2 from electrical, mechanical or hydraulic sources, it is possible that in the design of the motion pick-ups P1 and P2, their harmonic response characteristics may not be precisely matched. As a result, the harmonic distortion developed by one of the pick-ups can be different from that developed by the other. This consideration is of particular concern in the case where each of the two waveforms input to the difference amplifier have different harmonic distortion. Thus, the differences in harmonic distortion between P1 and P2 can provide a substantial contribution to the difference between the P1 and P2 signals.

Because the contribution of the fundamental to the difference signal has been minimized (by gain adjustment of U2 as discussed above), the presence of harmonic distortion can a create nonlinearity in the response of V6 versus mass flow rate for the circuit shown in FIG. 2. However, inclusion of a lock-in amplifier in both the difference channel and the sum channel effectively rejects all of the harmonic distortion present, so that linearity is improved from a response standpoint without having the added expense of designing pick-ups that are linear over their range of motion. Accordingly, the lock-in amplifier accomplishes many objectives in addition to the rejection of electrical/electronic noise introduced from mechanical, hydraulic, or electrical sources.

In FIG. 5 of the drawing an alternative embodiment of the circuit shown in FIG. 2 is illustrated wherein instead of using the integrator U5 in the circuit between difference amplifier U3 and lock-in amplifier U7, a differentiator U5' is used in the circuit connecting the output of summing amplifier U4 and the input to lock-in amplifier U8. It will be appreciated that the result of either embodiment is the same.

Figure 6:
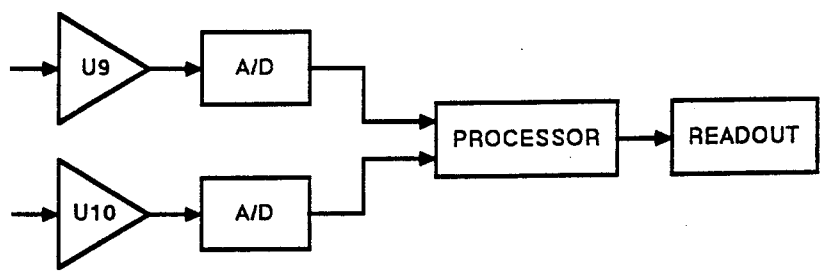
FIGS. 6, 7 and 8 illustrate alternative circuit arrangements for accomplishing the signal division function shown in FIG. 2.

In FIG. 6, another implementation of the circuit of FIG. 2 is suggested wherein instead of the voltage-to-frequency and counter circuits U11–U13 and U12–U14, analog-to-digital conversion circuits are used to convert the analog outputs of buffers U9 and U10 into digital signals which can be processed by the processor.

Figure 8:
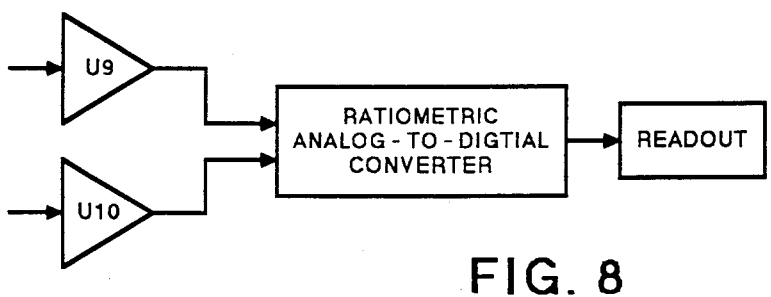

Another alternative configuration is shown in FIG. 8 wherein the outputs of U9 and U10 are fed into a ratiometric analog-to-digital converter to develop the output signal to be displayed by the readout device.

Figure 7:
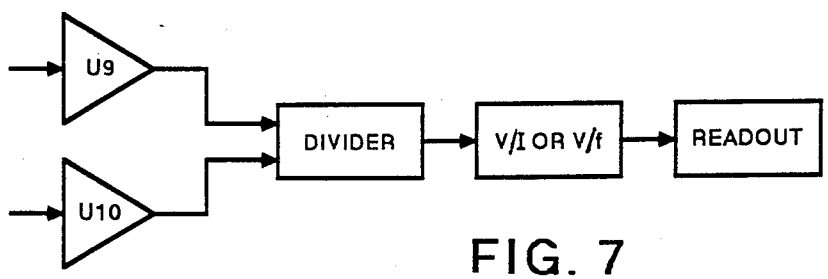

FIG. 7 discloses still another alternative configuration for the FIG. 2 circuit wherein the output of buffers U9 and U10 are fed into a divider, and the output of the divider is fed into a voltage-to-current or voltage-to-frequency converter the output of which is then displayed by the readout.

Figure 9:
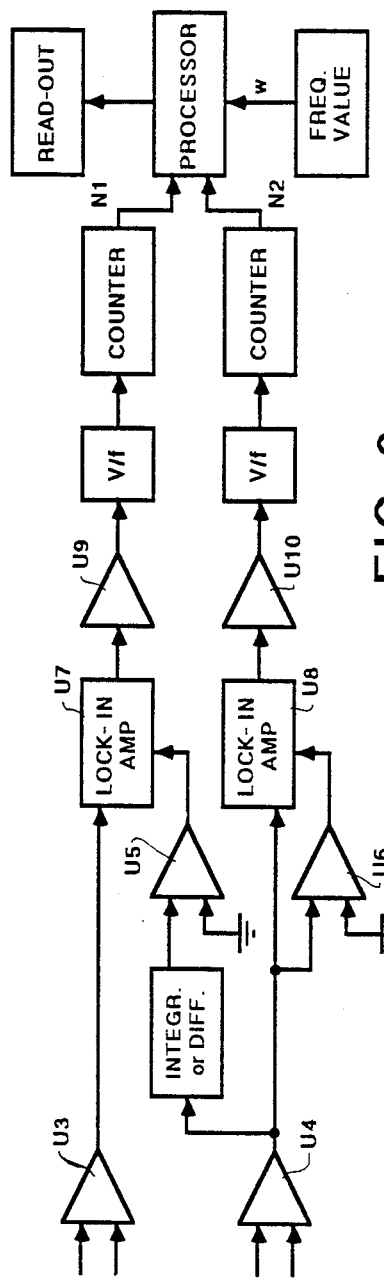
FIG. 9 is a block diagram illustrating an alternative embodiment of a portion of the present invention.

As pointed out above, the objective of the signal processing method of the present invention is to manipulate the signals from the two motion pick-ups P1 and P2 so as to obtain a signal which is proportional to Ar/wAe. An alternative way to accomplish this is to divide the difference signal V3 by the sum signal V4 together with a measurement of frequency w. Because the difference and sum signals are in time quadrature, the reference signal for the lock-in amplifier must be shifted 90 degrees in phase using an integrator or differentiator as shown in FIG. 9. As illustrated, this alternative embodiment provides means for dividing the difference signal, which is proportional to N1, by the sum signal, which is proportional to N2, and then divides the result by a frequency w to obtain a value N1/wN2 which relates linearly to the mass flow rate.

In FIG. 10 an alternative embodiment of the invention is depicted wherein instead of using the integrator shown in FIG. 2, the voltages V3 and V4 are input to a first divider which divides V3 by V4 to develop a voltage V5=V3/V4. This voltage and a frequency value proportion to the drive frequency value proportion to the drive frequency w are input to a second divider 62 which develops an output voltage $V6=V5/w$ which is proportional to the mass flow rate. It will of course be appreciated that an appropriately programmed microprocessor could be substituted for the two dividers and develop the voltage $V6$ in response to the inputs $V3$, $V4$ and $w$.

As discussed above, the approach taught by the Sipin '098, '944, '019 patents presents the difference between signals obtained from two velocity pick-ups to an AC voltmeter and controls the drive amplitude of the driving means with the sum of the same two signals obtained from pick-ups. Of the two readily apparent shortcomings of the Sipin approach, one is indicated by equation (9) above. More specifically, in the difference voltage $V3$ it can be seen that there is a frequency factor of $w$ introduced in its amplitude. This factor is the frequency of the driving voltage, and if there is any variation in that driving frequency, such variation will appear as an error in the indicated mass flow rate. If the flow meter is operating at resonance, the drive frequency will naturally vary with fluid density. Thus, in addition to there being an unwanted dependency on drive frequency, the drive frequency under resonant operation will vary with fluid density and produce an unacceptable error.

Conversely, use of the sum signal to control drive frequency presents a second problem with Sipin's approach in that if there is any aging of the components, or if the driving means is replaced, for example, the drive level will vary, and as is indicated in equation 8 above, if the excitation amplitude varies, the response amplitude is also going to vary. Accordingly, control of the drive signal based upon a summing of the two input signals can result in calibration errors as components age or are substituted or replaced, or for whatever reason, have characteristics which vary. These two shortcomings of the prior art are overcome in the present invention by integrating the difference signal to remove the unwanted frequency dependency. Thus, rather than attempting to control the influence that amplitude of the driving signal exerts on the mass flow rate measurement based upon the sum of the two signals, the integrated difference signal is divided by the sum signal.

The above mentioned Dahlin et al '421 patent teaches a tangent dependency of the measured phase difference on mass flow rate. This nonlinear relationship is undesirable from the standpoint of one wishing to develop a signal that is linear with mass flow rate, a common occurrence because from an electronics engineering standpoint, it is easier to deal with linear signals than with nonlinear signals. The present invention provides for such a linear relationship.

The teaching of the above mentioned Kappelt '089 patent concerns a phase measuring technique for relating phase shift to mass flow rate and indicates that the difference signal approach, using differential velocity measurement or differential voltage measurement, is only linear over a small range of phase shifts that may be no more than three degrees. The present invention likewise overcomes the shortcomings taught in the Kappelt patent regarding velocity difference methods.

Kappelt also explains how the difference method described in the Smith '450, '338 and '025 patents fails to properly take into account frequency, or frequency variations, which can result in mass flow measurement errors. Again, the present invention properly takes into account the effect of frequency on the measured signals and removes that dependency so that there is no problem.

The time difference measurement described in the referenced Smith patents is also an intermittent type of measurement the accuracy of which can be affected by harmonic distortion in the signals. Smith indicates in his '338 patent, that in order to always "track" the oscillation mid-plane, the motion sensing pick-ups must provide an output that is linear over their entire range of movement. Thus, use of a linear sensor output was required. No such restriction is required in the present invention and no linearity requirements are made on the response characteristics of the pick-ups.

The Smith technique is solely a time based approach that provides an intermittent measurement snap-shot of the condition of the conduit at a particular point in time wherein other non-Coriolis forces are minimized. Rather than providing a measurement of mass flow rate that is in any way of an intermittent nature, the present invention provides a measurement that is of a continuous nature throughout the conduit's oscillation cycle rather than an output that is registered only intermittently throughout the vibration cycle of the conduit. The present invention is thus a fundamentally different approach in terms of the signal processing method itself.

Whereas Smith measures the time difference between the mid-plane crossings of two signals, the present approach determines the electrical potential difference between two detected signals at the same time and makes such determination using a difference amplifier. From that point on, the ability to derive any relative timing information between the two input signals $P1$ and $P2$ is lost. Furthermore, since the integrated difference signal and the sum signal are always in phase with each other, there is no phase measurement of any kind performed between the outputs of $P1$ and $P2$ in the present invention.

The Roth '512 and '257, patents disclose methods for processing analog signals obtained from "velocity" type pick-ups that respond only to Coriolis induced motion in a circular shaped conduit, and then require two additional pick-ups that respond only to the driving motion in order to generate a reference signal for the synchronous demodulator used to compare the signals. In the alternative, a reference signal is derived from the electric motor that is used to excite or drive the conduit. The present invention can be distinguished over Roth in that both the measurement signals and the reference signal, or signals, are obtained from the same pick-ups.

Roth also discloses the connection of two pick-up coils together in series opposing fashion. This is unworkable in practice because it requires close matching of the response characteristics of the sensors and also requires a conduit structure that behaves in a highly symmetrical manner.

In FIG. 12 of the Smith '450 patent, an embodiment is illustrated including a pair of strain gages feeding a bridge circuit and an amplifier, and a reference signal is fed into a synchronous demodulator. That scheme is part of a force nulling scheme of which the present invention is in no way involved. Just like in Roth, Smith provides separate sensing means, or sensing transducers, and yet additional transducers to generate a reference signal. In the present invention the measurement and reference signals are derived from the same sensors.

Although the present invention has been described above in terms of various alternative embodiments, it will be appreciated by those skilled in the art that additional alternative embodiments, and alterations and modifications of the illustrated embodiments can be made. It is therefore intended that the appended claims be interpreted as covering all such alternatives, alterations and modifications as fall within the true spirit and scope of the invention.

What is claimed is:

1. Apparatus for measuring the mass flow rate of material flowing through at least one vibrating conduit comprising:
    a pair of motion detectors disposed at separate points along the conduit for detecting motion thereof and for developing first and second motion responsive analog voltage signals;
    differencing means responsive to said first and second analog voltage signals and operative to generate a difference signal which is proportional to the voltage difference therebetween;
    summing means responsive to said first and second analog voltage signals and operative to generate a sum signal which is proportional to the sum of the voltages thereof;
    integrating means for integrating said difference signal; and
    dividing means for dividing the integrated difference signal by said sum signal to develop an output signal proportional to the mass flow rate of material flowing through said conduit.

2. Apparatus for measuring the mass flow rate of material flowing through at least one vibrating conduit as recited in claim 1 and further comprising:
    comparator means responsive to said sum signal and operative to develop a reference signal, and
    a first lock-in amplifier means responsive to said integrated difference signal and said reference signal and operative to cause the integrated difference signal input to said dividing means to be a DC signal substantially immune to the effects of harmonic distortions produced by mechanical, hydraulic or electrical characteristics of the preceding signal carrying components.

3. Apparatus for measuring the mass flow rate of material flowing through at least one vibrating conduit as recited in claim 2 and further comprising:
    a second lock-in amplifier means responsive to said sum signal and said reference signal and operative to cause the sum signal input to said dividing means to be a DC signal substantially immune to the effects of harmonic distortions produced by mechanical, hydraulic or electrical characteristics of the preceding signal carrying components.

4. Apparatus for measuring the mass flow rate of material flowing through at least one vibrating conduit as recited in claim 3 wherein said dividing means includes:
    a first voltage-to-frequency converter for converting said integrated difference signal to a corresponding first alternating signal of a first frequency;
    a first counter responsive to the frequency of said first alternating signal and operative to generate a first digital signal proportional thereto;
    a second voltage-to-frequency converter for converting said sum signal to a corresponding second alternating signal of a second frequency;
    a second counter responsive to the frequency of said second alternating signal and operative to generate a second digital signal proportional thereto; and
    processor means responsive to said first and second digital signals and operative to develop an output signal which is proportional to said first digital signal divided by said second digital signal.

5. Apparatus for measuring the mass flow rate of material flowing through at least one vibrating conduit as recited in claim 1 wherein said dividing means includes:
    a first analog-to-digital converter for converting said integrated difference signal to a corresponding first digital signal;
    a second analog-to-digital converter for converting said sum signal to a corresponding second digital signal; and
    processor means responsive to said first and second digital signals and operative to develop an output signal which is proportional to said first digital signal divided by said second digital signal.

6. Apparatus for measuring the mass flow rate of material flowing through at least one vibrating conduit comprising:
    a pair of motion detectors disposed at separate points along the conduit for detecting motion thereof and for developing first and second motion responsive analog voltage signals;
    differencing means responsive to said first and second analog signals and operative to generate a difference signal which is proportional to the voltage difference therebetween;
    summing means responsive to said first and second analog signals and operative to generate a sum signal which is proportional to the sum of the voltages thereof;
    integrating means for integrating said sum signal;
    first comparator means responsive to the integrated sum signal and operative to develop a first reference signal;
    a first lock-in amplifier means responsive to said difference signal and said first reference signal and operative to develop a first DC signal which is substantially immune to harmonic distortions produced by mechanical, hydraulic or electrical characteristics of the preceding signal carrying components;
    second comparator means responsive to the integrated sum signal and operative to develop a second reference signal;
    a second lock-in amplifier means responsive to said sum signal signal and said second reference signal and operative to develop a second DC signal which is substantially immune to harmonic distortions produced by mechanical, hydraulic or electrical characteristics of the preceding signal carrying components; and
    dividing means for dividing said first DC signal by said second DC signal to develop an output signal proportional to the mass flow rate of material flowing through said conduit.

7. Apparatus for measuring the mass flow rate of material flowing through at least one vibrating conduit as recited in claim 1 wherein said dividing means includes:
    a first voltage-to-frequency converter for converting said integrated difference signal to a corresponding first alternating signal of a first frequency;
    a first counter responsive to the frequency of said first alternating signal and operative to generate a first digital signal proportional thereto;

a second voltage-to-frequency converter for converting said sum signal to a corresponding second alternating signal of a second frequency;

a second counter responsive to the frequency of said second alternating signal and operative to generate a second digital signal proportional thereto; and processor means responsive to said first and second digital signals and operative to develop an output signal which is proportional to said first digital signal divided by said second digital signal.

8. Apparatus for measuring the mass flow rate of material flowing through at least one vibrating conduit as recited in claim 7 wherein said dividing means includes:

a first analog-to-digital converter for converting said integrated difference signal to a corresponding first digital signal;

a second analog-to-digital converter for converting said sum signal to a corresponding second digital signal; and processor means responsive to said first and second digital signals and operative to develop an output signal which is proportional to said first digital signal divided by said second digital signal.

9. Apparatus for measuring the mass flow rate of material flowing through at least one vibrating conduit comprising:

a pair of motion detectors disposed at separate points along the conduit for detecting motion thereof and for developing first and second motion responsive analog signals;

differencing means responsive to said first and second analog signals and operative to generate a difference signal which is proportional to the voltage difference therebetween;

summing means responsive to said first and second analog signals and operative to generate a sum signal which is proportional to the sum of the voltages thereof;

first dividing means for dividing said difference signal by said sum signal to develop a corresponding first quotient signal;

means for developing a frequency signal proportional to the frequency at which said conduit is vibrating; and second dividing means for dividing said first quotient signal by said frequency signal to develop a second quotient signal which is proportional to the mass flow rate of material flowing through said conduit.

10. A method of measuring the mass flow rate of material flowing through at least one conduit, comprising the steps of:

causing a portion of said conduit to oscillate in displacement relative to a rest position;

detecting oscillatory motion of at least two separated points along said portion of the conduit and developing corresponding first and second motion responsive analog voltage signals;

subtracting said first signal from said second signal to develop a difference signal which is proportional to the voltage difference therebetween;

adding said first and second signals to develop a sum signal which is proportional to the sum of the voltages thereof;

integrating said difference signal to develop an integrated difference signal; and dividing the integrated difference signal by said sum signal to develop an output signal proportional to the mass flow rate of material flowing through said conduit.

11. A method as recited in claim 10 and further comprising the step of synchronously detecting the integrated difference signal prior to division by said sum signal to remove all signal components not in phase with said sum signal.

12. A method as recited in claim 11 where the integrated and synchronously detected difference signal and said sum signal are digitized and the digitized difference signal is divided by the digitized sum signal to develop said output signal.

13. A method as recited in claim 10 wherein the integrated difference signal and said sum signals are analog signals and the step of dividing the two signals is accomplished using an electrical signal processing technique.

14. A method for measuring the mass flow rate of material flowing through at least one conduit, comprising the steps of:

causing a portion of said conduit to oscillate at a frequency w relative to a rest position;

detecting oscillatory motion of the conduit at separate points along said portion of the conduit and developing first and second motion responsive analog voltage signals;

subtracting said first signal from said second signal to develop a difference signal which is proportional to the voltage difference therebetween;

adding said first and second signals to develop a sum signal which is proportional to the sum of the voltages thereof;

shifting the phase of a signal proportional to said sum signal by 90 degrees to develop a reference signal for synchronously detecting said difference signal to remove signal components not in phase with said reference signal;

dividing the detected difference signal by said sum signal to develop a corresponding first quotient signal;

developing a frequency signal proportional to the frequency w at which said conduit is caused to oscillate; and dividing said first quotient signal by said frequency signal by said frequency signal to develop a second quotient signal which is proportional to the mass flow rate of material flowing through said conduit.

15. A method of measuring the mass flow rate of material flowing through at least one conduit comprising the steps of:

causing a portion of said conduit to oscillate at a frequency w relative to a rest position;

detecting oscillatory motion of said conduit at separate points along said portion of the conduit and developing first and second motion responsive analog voltage signals;

subtracting said first signal from said second signal to develop a difference signal which is proportional to the voltage difference therebetween;

adding said first and second signals to develop a sum signal which is proportional to the sum of the voltages thereof;

dividing said difference signal by said sum signal to develop a corresponding first quotient signal;

developing a frequency signal having a value proportional to the frequency w at which said conduit is caused to oscillate; and dividing said first quotient signal by said frequency signal to develop a second quotient signal which is proportional to the mass flow rate of material flowing through said conduit.

16. A method as recited in claim 15 wherein the integrated difference signal and said sum signals are analog signals and the step of dividing the two signals is accomplished using an electrical signal processing technique.

* * * * *